UNITED STATES PATENT OFFICE.

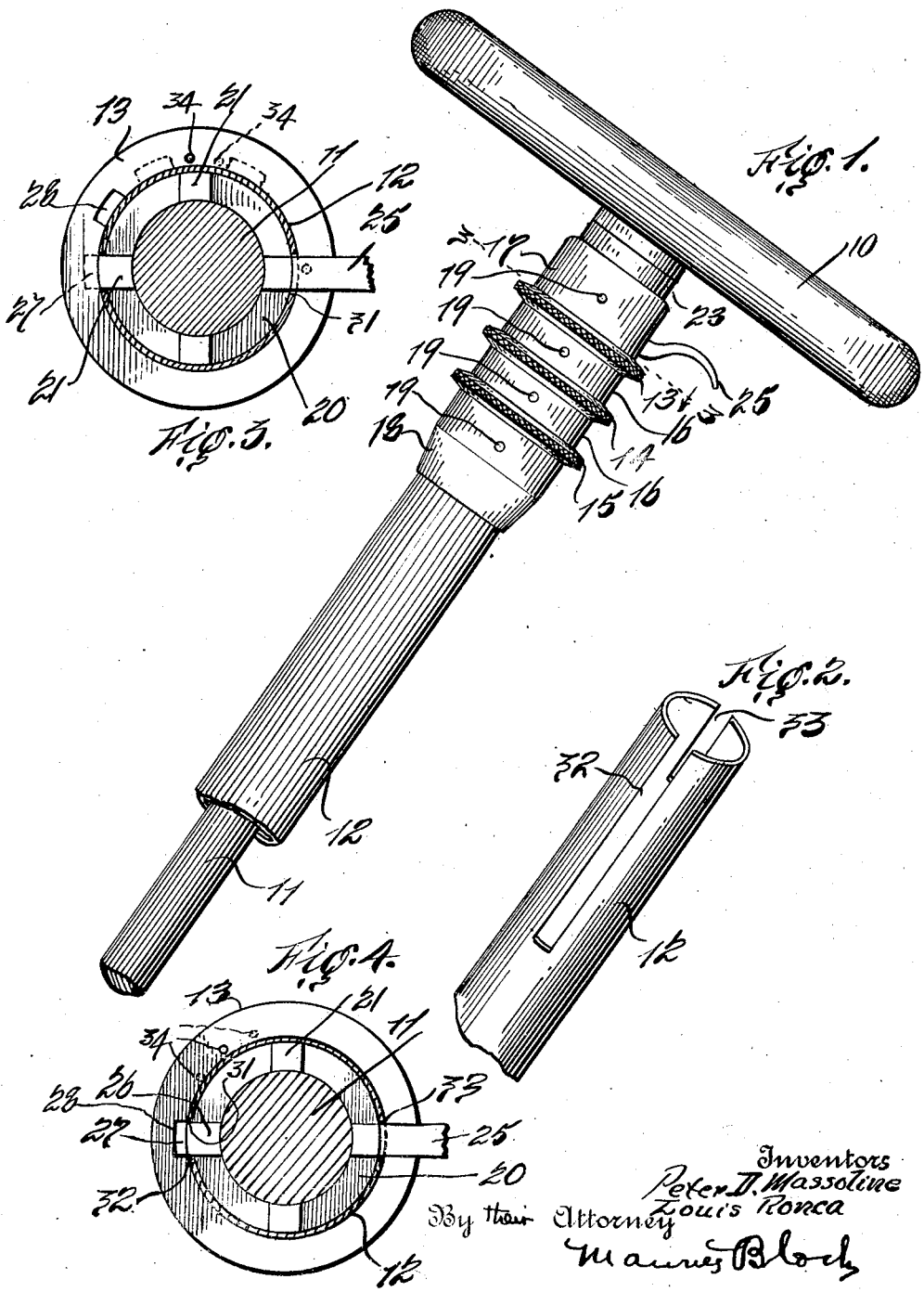

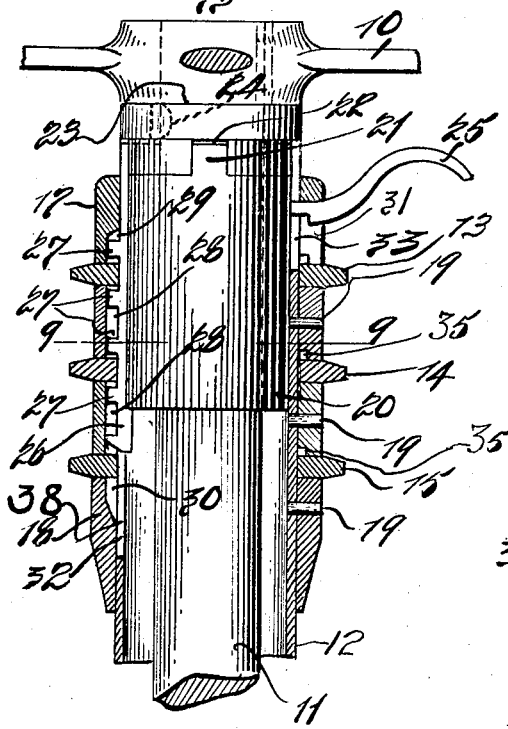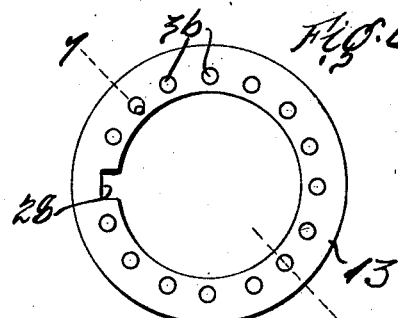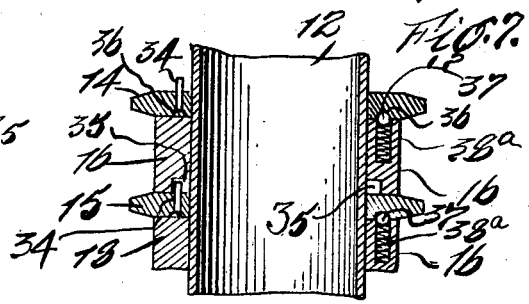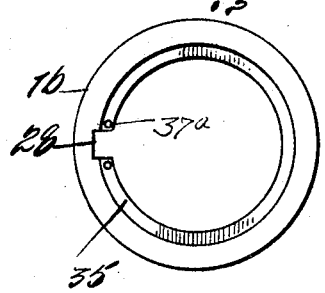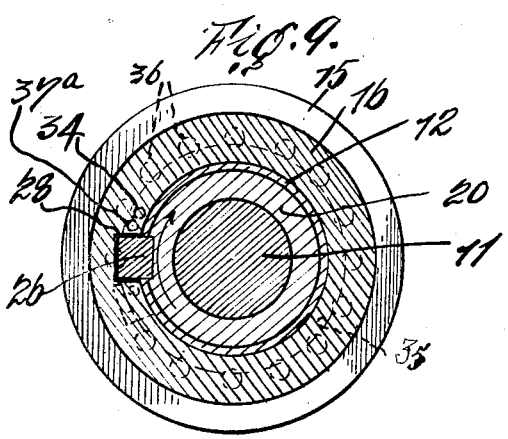

PETER D. MASSOLINE, OF JERSEY CITY, NEW JERSEY, AND LOUIS RONCA, OF NEW YORK, N. Y.

STEERING-WHEEL LOCK FOR MOTOR-VEHICLES.

1,353,487. Specification of Letters Patent. Patented Sept. 21, 1920.

Application filed December 16, 1919. Serial No. 345,304.

*To all whom it may concern:*

Be it known that we, PETER D. MASSOLINE, a citizen of the United States of America, and a resident of Jersey City, Hudson county, State of New Jersey, and LOUIS RONCA, a subject of the King of Italy, and a resident of New York city, county and State of New York, have jointly invented certain new and useful Improvements in Steering-Wheel Locks for Motor-Vehicles, of which the following is a full, clear, and exact description.

This invention relates to improvements in locking devices for the steering gear of motor vehicles, the chief object being to provide a device by means of which a steering wheel can be locked to prevent the operation of the vehicle by unauthorized persons. To carry out our invention, we provide a simple and effective device by which means the steering wheel, post, etc., can be locked and rendered useless, for steering purposes, at the will of the operator of the vehicle, to prevent theft thereof.

One of the features of the device is the combination locking means; that is to say, a locking means requiring knowledge of a certain combination to enable one to unlock the locked wheel.

We will now proceed to describe our invention in detail, the novel features of which we will point out in the appended claims, reference being had to the accompanying drawings, forming part hereof, wherein:—

Figure 1 is a side elevation of a portion of the steering mechanism for a motor vehicle;

Fig. 2 is a fragmentary perspective view of the post housing;

Fig. 3 is a sectional view enlarged illustrating the position of the parts when a steering wheel is locked, the section being taken on a line 3—3 in Fig. 1;

Fig. 4 is a similar view, illustrating the parts unlocked;

Fig. 5 is a vertical sectional view, illustrating the wheel and post locked against movement;

Fig. 6 is a bottom plan view of one of the rotatable disks;

Fig. 7 is a fragmentary sectional view illustrating two of the rotatable disks and associated sleeves;

Fig. 8 is a bottom plan view of one of the sleeves; and

Fig. 9 is an enlarged cross-sectional view, the section being taken on a line 9—9 in Fig. 5.

In the drawings, a steering-post is indicated by 11, a wheel, secured to the post, by 10 and a housing, for the post, by 12. Our invention comprises a plurality of disks 13, 14 and 15 rotatably supported by the housing 12 and spaced apart by sleeves 16, the end disks 13 and 15 having in contact therewith coöperating collars 17 and 18. The collars 17 and 18, as well as sleeves 16, are secured to the housing 12 by means of pins 19. Within the housing 12 we slidably mount a block 20 having projections or teeth 21 to engage recesses 22 in a collar 23 rigidly secured to post 11, in this instance by a key 24. The block 20 is arranged to be moved longitudinally of the post 11 by means of a handle 25. The block 20 is further provided with a bar 26 having projections or teeth 27 outstanding therefrom. To permit block 20 to be moved longitudinally of the post to engage collar 23 to lock wheel 10 against operation as a steering element, we provide each disk 13, 14 and 15 and sleeves 16 with a slot 28 to receive the projections 27 on bar 26. The collars 17 and 18 are also each provided with a recess 29 and 30, respectively, to permit the end projections 27 to be moved to clear the disks adjacent thereto. The upper collar 17 is further provided with a slot 31 for the passage therethrough of handle 25. The slots indicated by 32 and 33 (Fig. 2), as well as in Fig. 5, are obviously to receive the bar 26 and handle 25, respectively. When block 20 is raised to its highest position, as indicated in Fig. 5, the wheel 10 will be locked against movement, for the reason that projections 21 on block 20 will engage recesses 22 in collar 23, the block 20 being held against rotation by the engagement of slot 32 by the bar 26, as well as the engagement of slot 33 by handle 25. When block 20 is moved down to cause projections 21 to leave recesses 22, the wheel 10 and post 11 can be turned or operated for steering purposes. Whether block 20 can be moved or not depends upon the position of disks 13, 14 and 15, or rather upon the position of the slots in said disks relatively to the slots 28 in sleeves 16. Before said block can be moved longitudinally of post 11, the slots 28 in disks 13, 14 and 15 have to be brought into alinement with slots 28 in sleeves 16. To cause said slots to aline, the disks have to be rotatably moved to a predetermined selected extent. The extent to which each disk is moved is optional, a number of different combinations being obtainable.

To set the disks to a certain combination we employ pins 34, there being a pin in each disk 13, 14 and 15, said pins or stops being used as a starting point when the combination is to be employed to cause slots 28 to aline. The pins 34 operate in rabbet grooves 35 in the superimposed sleeves or collars. In other words, pin 34 in disk 13 will operate in a rabbet groove in collar 17, while the pins 34 in disks 14 and 15 will operate in a groove in sleeves 16. Each disk (in this instance) is moved to a different extent to cause slots 28 to aline. The amount of movement for each disk is determined by the position of the pins 34 relative to the slots 28 in the disks. Each disk 13, 14 and 15 is provided with recesses 36 equally spaced, and each sleeve 16 and lower collar 18 is provided with a latch 37 in the form of a ball, which is forced against its adjacent disk by a spring 38$^a$. In this instance, pin 34 in disk 13 is located at the third recess therein, and pin 34 in disk 14 is located at the fourth recess therein. In Fig. 7 the disk 13 is intersected at the line 7—7 of Fig. 6 showing pin 34 at the third recess; assuming the wheel to be locked and the operator of the vehicle desires to unlock same, he would first rotate the disks to cause pins 34 to contact with coöperating stop pins 37$^a$ which form the starting point of pins 34 and which are located close to the slot 28 in the superimposed collar or sleeve (see Fig. 9). The slots 28 will, of course, be out of alinement still. To cause the slots to aline, disk 13 would be rotated to the extent of two recesses 36; the latch associated therewith would click twice thereby giving notice that two recesses have been employed, and the disk 14 to the extent of three recesses, and the disk 15 to the extent of four recesses, the latches for each disk serving as a tell-tale. The slots 28 would now be in alinement and block 20 can be lowered, causing projections 21 to leave recesses or slots 22 in block 23, after which the wheel and post can be rotated. When the block drops, the teeth or projections 27 will be positioned between the disks in the slots 28 in collars 16. The stop 38 at the end of recess 30 in collar 18 serves to position the block to produce the above mentioned result. If desirable, the disks can be rotated to cause the slots 28 to be again out of alinement thus preventing the raising of the block to lock the wheel.

To lock the wheel, at any time, the disks would be again moved to cause the slots 28 to aline after which the block 20 can be raised to engage collar 23. After the wheel has been locked, the combination can be destroyed.

Our device is arranged so that we can change the combination at any time by merely changing the position of pins 34 relative to the slots 28. Multiple holes for the pins 34 will be drilled at the position of recesses 36, so that the pins may be changed from one hole to the other to change the combination, as we depend upon the clicking of the latches to notify the user when the disk has been moved to the required extent. By clicking we do not necessarily mean a noise, but rather a slight shock, which can be felt as the balls are forced into the recesses by the springs. When operated in the dark, this feature of our invention is valuable.

What we claim and desire to secure by Letters Patent is:

1. In a vehicle lock, a steering post, an annular locking bolt slidable upon said post, tumblers surrounding said bolt to control the movement of said bolt, means mounted upon said bolt for abutting said tumblers adapted to resist the movement of said bolt, passages in said tumblers for said abutting means at a predetermined position of said tumblers, a housing, said housing and bolt provided with clutch faces whereby upon a predetermined movement of said bolt said steering post is locked from rotation.

2. In a vehicle lock, a steering post, a housing, a locking bolt slidable longitudinally of said housing for locking said post relative to said collar and means for engagement of said locking bolt with said post, a plurality of tumblers surrounding said post for controlling the movement of said bolt, spacing sleeves between said tumblers, grooves in said spacing sleeves, abutments in said tumblers, and abutments in said grooves to engage the abutments in said tumblers.

3. In a vehicle lock, a steering post, a housing, a plurality of tumblers surrounding said post and an annular locking bolt provided with a notched projection for interconnecting said housing with said post and releasing said post when said tumblers are in a predetermined position, a plurality of spacing members between said tumblers, and affixed to said housing the bolt projection extending through said housing, and movable longitudinally therein.

PETER D. MASSOLINE.
LOUIS RONCA.